United States Patent
Zhu et al.

(10) Patent No.: US 7,454,797 B2
(45) Date of Patent: Nov. 18, 2008

(54) SECURE IMAGE AUTHENTICATION WITH DISCRETE LEVEL TAMPER LOCALIZATION

(75) Inventors: Bin Zhu, Edina, MN (US); Jinhai Wu, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 10/963,696

(22) Filed: Oct. 13, 2004

(65) Prior Publication Data

US 2006/0080743 A1 Apr. 13, 2006

(51) Int. Cl.
    H04L 29/00 (2006.01)
(52) U.S. Cl. .......................... 726/30; 713/176
(58) Field of Classification Search ............... 726/30; 713/179

See application file for complete search history.

(56) References Cited

U.S. PATENT DOCUMENTS

| | | | |
|---|---|---|---|
| 2005/0246536 A1* | 11/2005 | Roberts | 713/176 |
| 2006/0020830 A1* | 1/2006 | Roberts | 713/194 |
| 2006/0059349 A1* | 3/2006 | Roberts | 713/176 |
| 2006/0095775 A1* | 5/2006 | Jajodia et al. | 713/176 |

FOREIGN PATENT DOCUMENTS

WO  WO2004/002159  12/2003

OTHER PUBLICATIONS

Hasan et al, "Fragile Blockwise Image Authentication Thwarting Vector Quanization Attack", 2004, IEEE, pp. 530-533.*

Celik, et al., "Hierarchical Watermarking for Secure Image Authentication with Localization", IEEE Transactions on Image Processing, vol. 11, No. 6, Jun. 2002, pp. 585-595.

Fridrich et al., "New Fragile Authentication Watermark for Images" Image Processing, 2000. Proceedings. 2000 International Conference on Sep. 10-13, 2000, Piscataway, NJ, USA, IEEE, vol. 1, Sep. 10, 2000, pp. 446-449.

Fridrich, "A Hybrid Watermark for Tamper Detection in Digital Images" International Symposium on Signal Processing and its Applications. Proceedings, vol. 1, Aug. 22, 1999, pp. 301-304.

Li et al., "Fragile Authentication Watermark Combined with Image Feature and Public Key Cryptography" Signal Processing, 2004. Porceedings. ICSP '04. 2004 7th International Conference on Beijing, China Aug. 31-Sep. 4, 2004, Piscataway, NJ, USA, IEEE, Aug. 31, 2004, pp. 2286-2289.

Li et al., "Proceedings of the 17th International Conference on Pattern Recognition", Aug. 23-24, 2004.

(Continued)

*Primary Examiner*—Matthew B Smithers
(74) *Attorney, Agent, or Firm*—Lee & Hayes, PLLC

(57) ABSTRACT

Systems and methods for secure multimedia authentication with discrete level tamper localization are described. In these aspects, the term "discrete" means that tamper localization is at the pixel level with respect to an image or video data, or at the sample level with respect to audio data. More particularly, and in one aspect, multimedia is evaluated to determine authenticity of the multimedia. This evaluation is based on data block(s). Responsive to determining that the multimedia is not authentic, a tampered portion of the multimedia is localized by addressing each respective pixel or sample of the tampered portion.

36 Claims, 5 Drawing Sheets

OTHER PUBLICATIONS

EPO Communication with Search Report dated Mar. 17, 2006, from counterpart EP patent application, European Patent Application No. 05109428.2, 9 pages.

Fridrich et al, "Cryptanalysis of the Yeung-Mintzer Fragile Watermarking Technique," J. Electronic Imaging, vol. 91, 2002, pp. 1-35.

Fridrich et al, "Further Attacks on Yeung-Mintzer Fragile Watermarking Scheme," Proc. SPIE, vol. 3971, Security and Watermarking of Multimedia Contents II, San Jose, CA, Jan. 2000, pp. 428-437.

Fridrich, "Security of Fragile Authentication Watermarks with Localization," Proc. SPIE vol. 4675, Security and Watermarking of Multimedia Contents IV, Jan. 2002, pp. 691-700.

Holliman et al, "Counterfeiting Attacks on Oblivious Block-wise Independent Invisible Watermarking Schemes," IEEE Trans. Image Processing, vol. 9, No. 3, Mar. 2000, pp. 432-441.

Li et al, "Oblivious Fragile Watermarking Scheme for Image Authentication," IEEE Int. Conf. Acoustics, Speech, & Signal Processing, Orlando, FL, USA, May 2002, vol. VI, pp. 3445-3448.

Lu et al, "Fragile Watermarking Scheme for Image Authentication," Electronics Letters, vol. 39, No. 12, Jun. 2003, pp. 898-900.

Memon et al, "On the Security of the Yeung-Mintzer Authentication Watermark," Proc. IS&T PICS Symp., Savannah, Georgia, Mar. 1999, 7 pgs.

Wu et al, "Efficient Oracle Attacks on Yeung-Mintzer and Variant Authentication Schemes," IEEE Int. Conf. Multimedia & Expo, Taiwan, Jun. 2004, 4 pgs.

Yeung et al, "An Invisible Watermarking Technique for Image Verification," IEEE Int. Conf. Image Processing, 1997, vol. 2, pp. 680-683.

Yeung et al, "Invisible Watermarking for Image Verification," J. Electronic Imaging, vol. 7, No. 3, Jul. 1998, pp. 578-591.

Zhong et al, "A New Fragile Watermarking Technique for Image Authentication," Int. Conf. Signal Processing, Beijing, vol. 9, Aug. 2002, pp. 792-795.

Zhu et al, "Multimedia Authentication and Watermarking," Multimedia Information Retrieval and Management, Eds., Springer-Verlag, Berlin, Heidelberg, New York, 2003, Chap. 7, pp. 148-178.

Zhu et al., "When Seeing Isn't Believing," IEEE Signal Processing, vol. 21, No. 2, Mar. 2004, pp. 40-49.

* cited by examiner

SECURE IMAGE AUTHENTICATION WITH DISCRETE LEVEL TAMPER LOCALIZATION

TECHNICAL FIELD

This disclosure relates to multimedia authentication and tampered pixel or sample localization.

BACKGROUND

Multimedia authentication is a technology to check authenticity and integrity of multimedia signals. It is often desirable to localize tampered pixels or samples for a tampered signal so unmodified parts can still be used. Technologies to fulfill this goal have been actively studied in recent years. A class of proposed technologies, called complete or hard authentication, is to detect any modifications to a multimedia signal. Hard authentication technologies can be classified into pixel-wise schemes and block-wise schemes. A pixel-wise scheme is designed to localize tampered pixels (or samples that are implied by "pixels" in the following without explicit reference for audio signals) in additional to verify authenticity for the whole signal. A block-wise scheme, on the other hand, is designed to localize tampered blocks. A block-wise scheme is securer in general than a pixel-wise one, but has much coarser tamper localization capability. Details on proposed authentication technologies can be found in [1][2].

One of the first pixel-wise authentication schemes was the fragile watermarking scheme proposed by Yeung and Mintzer (Y-M scheme) [3][4]. For grayscale images, the Y-M scheme applies a secret binary function to map the value of each pixel, perturbed if necessary, to a preset logo bit. The scheme is able to localize a single tampered pixel. Its vulnerabilities under various circumstances were reported in [5]-[9], and fixes in [10]-[13]. A typical fix is to introduce neighborhood dependency in mapping a pixel to a logo bit, such as the scheme proposed in [10]. These fixes can thwart the attacks reported in [5]-[9], but, as pointed out by Fridrich in [14], are vulnerable to oracle attacks if the pixel scan order, i.e., the order that pixels are watermarked in the embedding process, is public, and if the oracle returns locations of the detected tampered pixels. Fridrich attributed this new vulnerability to the inherent sequential nature in modifying pixels during the watermarking process in a pixel-wise scheme, and believed that no pixel-wise schemes could fix this vulnerability. She turned attention to develop a block-wise scheme in [14] which does not suffer from any of the aforementioned vulnerabilities for pixel-wise schemes. Unfortunately, a block-wise scheme greatly reduces the tampering localization capability. A tampered pixel can no longer to be identified.

Moreover, all existing pixel-wise schemes, regardless of whether pixel scan order is public or private/secret, are vulnerable under oracle attacks. Such schemes typically assert that an image is authentic if no pixel is found tampered. In such schemes, the authenticity of a pixel is checked by applying a many-to-one mapping function to map the value of each pixel to a bit which is compared against a logo bit. Pixels are watermarked sequentially, one pixel at a time. These features enable pixel-wise schemes with good perceptual quality, but are also exploited by oracle attacks. (See also, "Efficient Oracle Attacks on Yeung-Mintzer and Variant Authentication Schemes", Jinhai Wu et al, June 2004, which is incorporated by reference).

In view of the above, block-wise image authentication schemes are typically considered to be the only viable solution. One such solution is a blockwise authentication scheme which can localize tampered blocks rather than a single pixel—for security reasons, the size of a block is generally 128 pixels or larger.

Although block-wise schemes are generally considered to be the only image authentication techniques that are not vulnerable to oracle attacks, many applications would benefit from an authentication scheme that has a finer tamper localization capability. Unfortunately, as described above, existing pixel-wise schemes, regardless of whether pixel scan order is public or secret, are vulnerable under oracle attacks.

SUMMARY

Systems and methods for secure multimedia authentication with discrete level tamper localization are described. In these aspects, the term "discrete" means that tamper localization is at the pixel level with respect to an image or video data, or at the sample level with respect to audio data. More particularly, and in one aspect, multimedia is evaluated to determine authenticity of the multimedia. This evaluation is based on data block(s). Responsive to determining that the multimedia is not authentic, a tampered portion of the multimedia is localized by addressing each respective pixel or sample of the tampered portion.

BRIEF DESCRIPTION OF THE DRAWINGS

In the Figures, the left-most digit of a component reference number identifies the particular Figure in which the component first appears.

DETAILED DESCRIPTION

An Exemplary System

Figure 1:
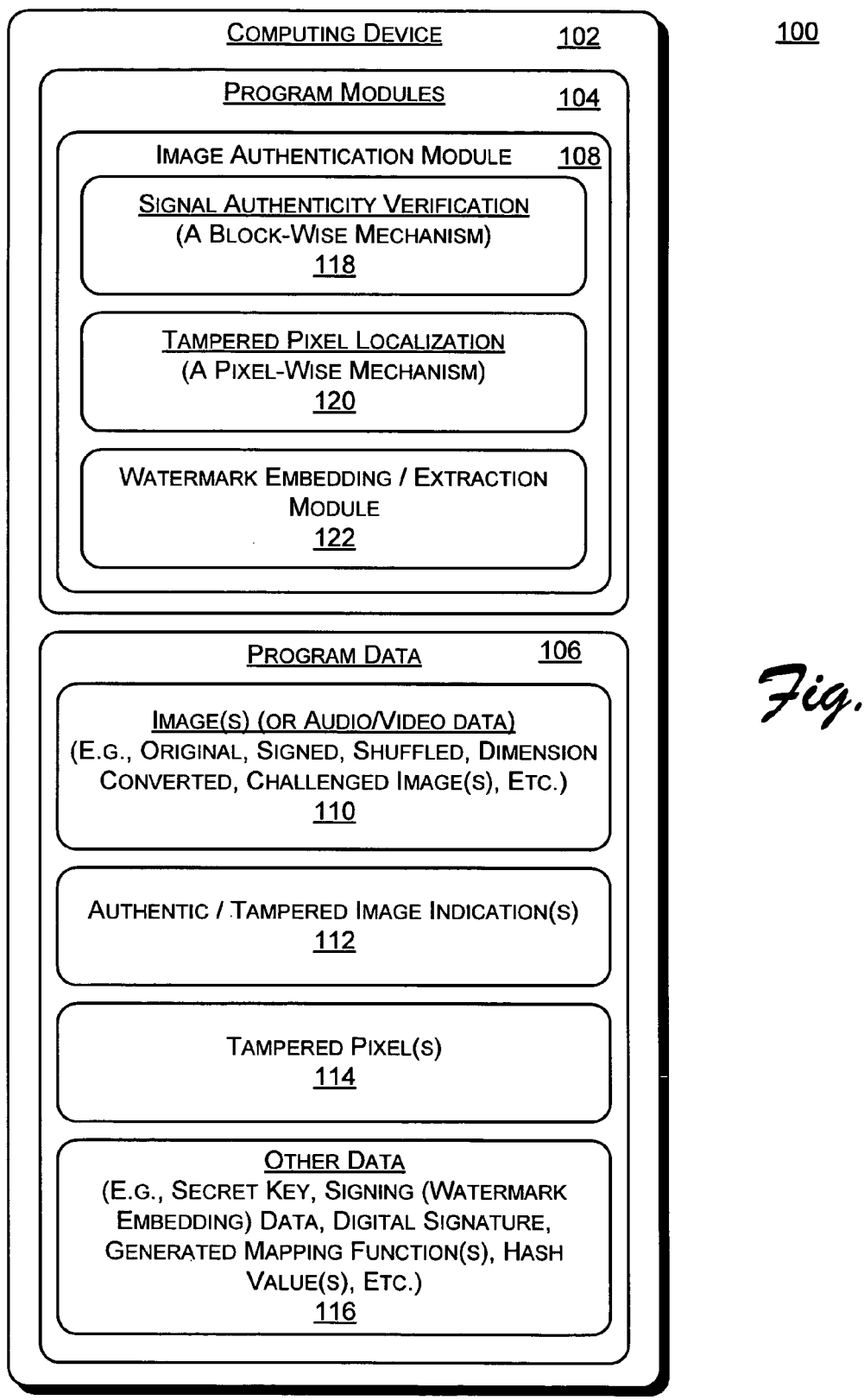
FIG. 1 illustrates an exemplary system for secure image authentication with discrete tamper localization.

FIG. 1 illustrates an exemplary system 100 for secure image authentication with discrete tamper localization. System 100 includes computing device 102, which includes program module(s) 104 and program data 106. Program modules 104 include, for example, image authentication module 108, which performs secure image authentication with discrete tamper localization. Program data 106 includes, for example, image(s) 110, authentic and/or tampered image indication(s) 112, tampered pixel(s) 114, and other data 116.

Image authentication module 108 provides an authentication scheme that securely authenticates an image 110 with dual independent mechanisms, including signal authenticity verification 118 and tampered pixel localization 120 mechanisms. These integrated but independent mechanisms merge the best of a pixel-wise scheme and of a block-wise scheme into a single system to provide a secure authentication scheme with discrete tamper localization capability that is secure to all known attacks, while maintaining discrete tamper localization. The signal authenticity verification 118 and tampered pixel localization 120 are optimized for their respective tasks. This is in contrast to existing pixel-wise schemes, which are subject to vulnerability because they utilize a single mechanism for two very different purposes: authenticity verification and tamper localization.

More particularly, signal authenticity verification 118 implements a block-wise scheme to verify authenticity of an image 110. In one implementation, an entire image 110 is considered to be a block. In another implementation, image 110 is segmented into multiple disjoint blocks, and a block-wise scheme is applied to each block. Tampered pixel localization 120 is integrated with signal authenticity verification 118 to provide a pixel-wise mechanism to localize tampered pixels. The pixel-wise mechanism addresses each pixel individually in an image 110 to provide pixel-level tamper localization. This is different from the block-wise scheme in signal authentication verification 118 which produces a output (authentic or not) to indicate the status for a whole block, i.e. a collection of pixels, and therefore cannot indicate the status for each pixel in the block. Tampered pixel localization 120 utilizes one or multiple previously watermarked pixels in a pixel scan order as a neighborhood of the current pixel. Any ways to order pixels in an image can be used as the pixel scan order. The scan order can be publicly disclosed or kept as secret information. In a particular implementation to be described below, random ordering of pixels is used as the pixel scan order. As explained below, this random ordering of pixels enables a post-processing process to refine candidates of tampered pixels, and therefore improves probability of detecting even a single tampered pixel of an image 110. A method to generate random ordering of pixels is given later in this manuscript.

In this implementation, for purposes of discussion and exemplary application, image 110 is an L-bit grayscale image 110, L>1, although the described operations of image authentication module 108 can also operate on color image(s) or multimedia types such as audio or video data. For example, for color images, image authentication module 108 hash operations for grayscale images may be applied to all color components. The resulting digital signature is embedded to one color component such as the Y-component; while operations of tampered pixel localization 120 for grayscale images can be applied independently to each color component. An alternative implementation for color image is to apply operations of image authentication module 108 for grayscale images to each color component independently. In this case, signal authenticity verification 118 can verify authenticity for each color component.

Exemplary Image Signing Procedure

Tampered pixel localization 120 implements watermarking operations by embedding a fragile watermark into image 110. Fragile watermark is a special type of watermarks whose integrity is destroyed when the watermarked signal undergoes small changes. This watermark is used to detect/localize tampered pixels. Signal authenticity verification 118 generates a digital signature or MAC (Message Authentication Code). For purposes of illustration, the digital signature or MAC is shown as a respective portion of "other data" 116. Watermarking component 122 utilizes a least significant bit embedding (watermarking) to embed the digital signature or MAC into selected pixels of image 110, potentially along with other optional embedding data such as image ID, image size, title, owner information, etc. Watermarking component also extracts the watermarking and possibly other data from the watermarked image 110.

Figure 2:
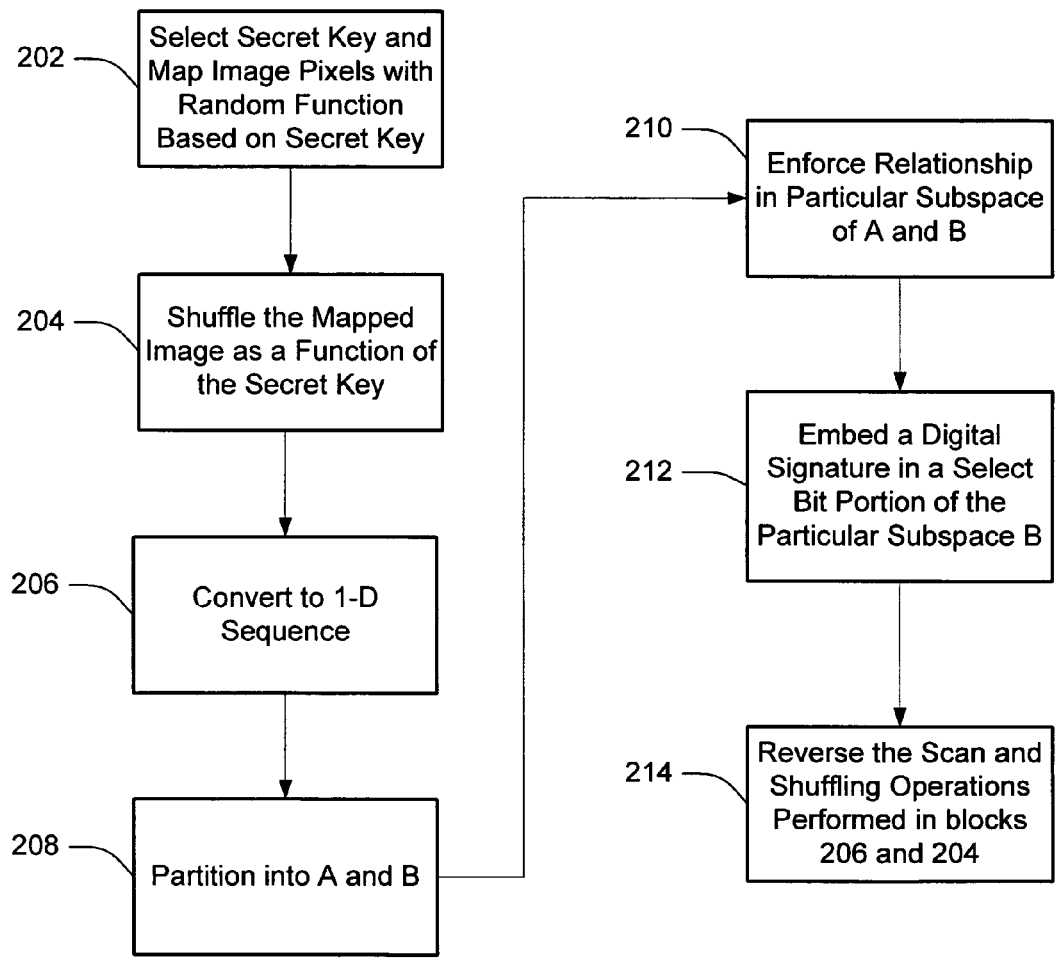
FIG. 2 shows an exemplary procedure for signing multimedia such as an image.

FIG. 2 shows exemplary operations of procedure 200 to sign a grayscale image 110. For purposes of discussion, aspects of the procedure are discussed with respect to the features of FIG. 1. The left-most digit of a component reference number identifies the particular figure in which the component first appears. At block 202, image authentication module 108 uses a secret key K selected for the grayscale image I 110 to generate a random mapping function $f$. The word "secret" means that the key should be kept as a secret. This term "secret key" K is different from the "private key" in a public/private encryption cipher, which is also used in some of our implementations. The secret key K is selected by a user and input to module 108. Random mapping function $f$ maps an integer in $[0,2^L-1]$, i.e., a pixel value, to binary value: $f(x)=b$, $\forall x \in [0,2^L-1]$, where b is either 1 or 0. In one implementation, key K is kept separately from the image I. In an alternative implementation, K is encrypted and inserted into a header of the image 110 or embedded into the least significant bits of pre-selected pixels of the image I with the watermarking module 122.

At block 204, image authentication module 108 shuffles the image I 110 to a randomized image: $X=\text{Shuffle}_K(I)$, where the shuffling function $\text{Shuffle}_K(\cdot)$ depends on the key K. In this implementation, secret key-based shuffling is used which makes the neighborhood pixels for each pixel secret. In another implementation, a shuffling function that randomly permutes pixels is used and publicly disclosed. This randomizes the neighborhood pixels/samples so that the fact that modified pixels in a typical modification are connected can be exploited by tampered pixel localization module 120 to differentiate a tampered pixel from its neighbor pixel(s) used in fragile-watermarking the pixel. Recall that neighbor pixels are typically used in fragile-watermarking a pixel to improve detection probability of tampered pixels. A change to a pixel P or its neighbor pixels may disturb the integrity of the pixel P, and detected by the fragile watermark. A binary logo L of the same size as the image I is used by image authentication module 108 to check integrity of a fragile watermark. A binary logo L is a binary image generated or selected by a user, and is widely used in fragile watermarking to detect tampered pixels. In this implementation, only image 110 undergoes shuffling operation while the logo L does not. In an alternative implementation, the logo L undergoes the same operations of block 204 as the image I, i.e., the sample shuffling function is applied to the logo L.

At block 206, both X (the shuffled image) and the logo L are ordered into a 1-D vector of length N by zigzag scan, row-by-row scan, or an arbitrary scan, where N is the number of pixels in the image I 110. For simplicity of description, these 1-D vectors will still be represented as X and L, respectively. Note that there is a one-to-one correspondence between a 2-D image and the corresponding 1-D vector. This will not generate any confusion since it is easy to tell which one should be used in a context. For example, a single-indexed X such as X(i) means the i-th element in the 1-D vector X, while a double-indexed X such as X(i, j) means the element at i-th row and j-th column of the 2-D image X.

At block 208, image authentication module 108 partitions all pixels in X (the converted image) into first and second disjoint subspaces—A and B—such that B contains the last r pixels and A contains the remaining pixels. The least significant bit (LSB) of each pixel in B is set to zero. The value of r is discussed below with respect to the hashing operation. At block 210, image authentication module 108 enforces a relationship in a particular subspace of the first and second disjoint subspaces. For example, in one implementation, image authentication module 108 zeros-out the least significant bits of partition B. More particularly, for i-th pixel X(i), where i runs from 1 to N, image authentication module 108 enforces the following relationship, with X(i) possibly perturbed if necessary:

$$L(i)=f(X(i-1) \oplus X(i)), 1 \le i \le N, \quad \text{Equ. (1),}$$

wherein X(0)=0 and $\oplus$ represents an XOR operation. If X(i) is in B, the perturbed value should be even, i.e., the LSB after perturbation is still 0. This operation is applied to all the pixels of X. This implementation uses one previously watermarked pixel in the mapping equation Equ. (1). In an alternative implementation, multiple previously watermarked pixels are utilized in the mapping equation.

At block 212, image authentication module 108 embeds a digital signature in a specific bit portion of the particular subspace B. In one implementation, for example, image authentication module 108 hashes resulting X (result from block 208) with a one-way cryptographic hash function H (e.g., SHA-1 or MD5) to generate a hash value of X. One-way hash function H converts an arbitrary string such as an 1-D vector into a string of fixed digits. In one implementation, image authentication module 212 encrypts the hash value with the private key of an asymmetric encryption to generate a digital signature D. The value of r in the partitioning operation (block 208) is the size of D in number of bits. D is embedded into the LSBs of the pixels in B. If additional data is needed to be embedded in the image I, the value of r should be large enough to represent both D and the additional information in bits; the additional data is embedded together with D.

In another implementation of the operations of block 212, a keyed hash or MAC is applied to the resulting X after operations in block 208 to generate a digest D. For simplicity of description, this value is still referred to as a digital signature in this manuscript. Use of a hash function and MAC are different in that if MAC or keyed hash is used, they are embedded directly without encryption.

At block 214, image authentication module 108 reverses the scan and the shuffling operations of block 206 and block 204 to finish the process of signing the image 110.

Exemplary Authenticity Verification

Figure 3:
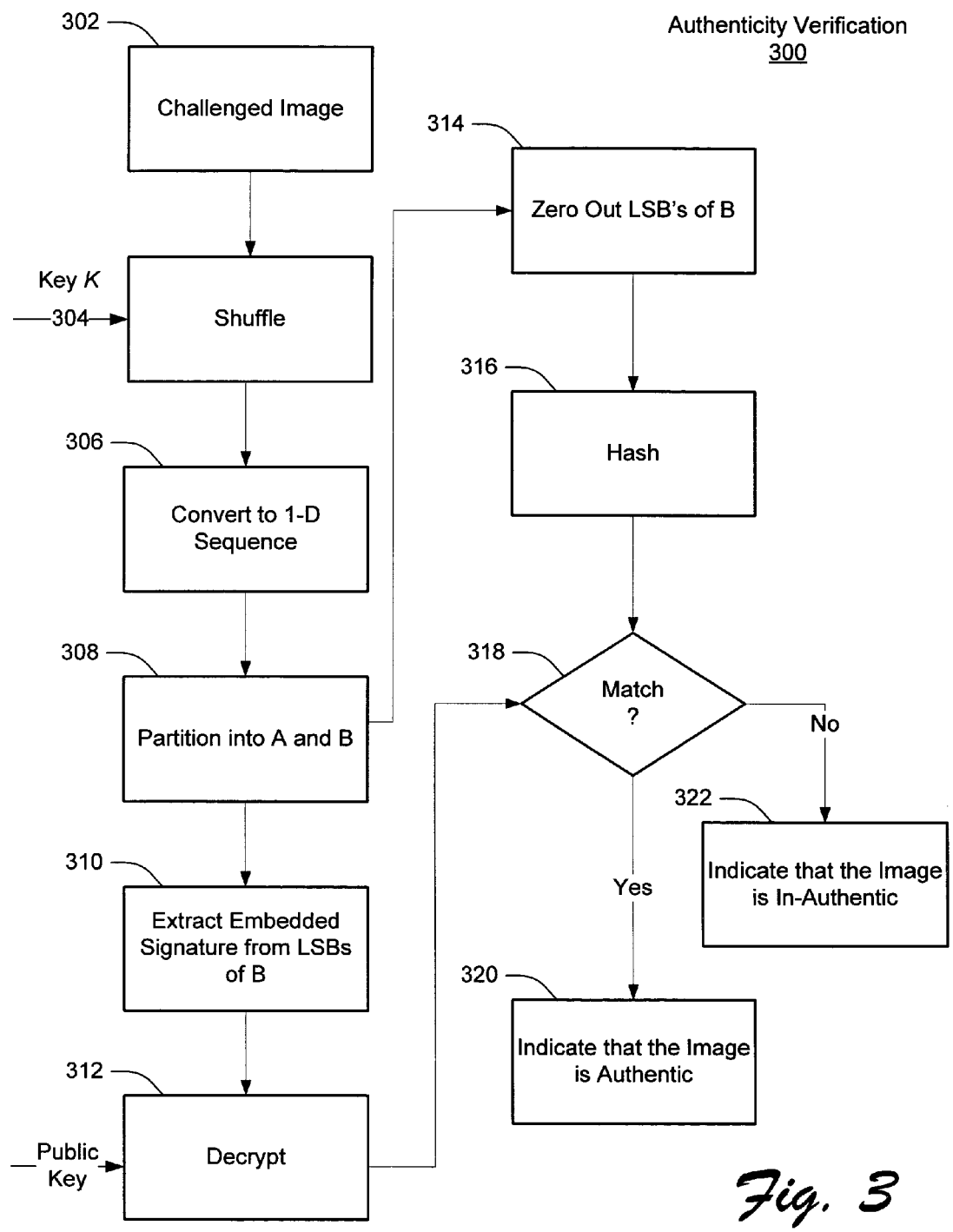
FIG. 3 shows an exemplary procedure for secure image authentication in the system of FIG. 1.

FIG. 3 shows an exemplary procedure 300 for image authentication. For purposes of discussion, aspects of the procedure are discussed with respect to the features of FIG. 1. The left-most digit of a component reference number identifies the particular figure in which the component first appears. Signal authenticity verification 118 verifies authenticity of a challenged image I' (i.e., an image 110) as follows. At block 302, a challenged image 110 is input. The challenged image may have been signed and/or undergone other operations (known and/or unknown operations). At block 304, a shuffling function Shuffle$_K(\cdot)$ and a secret key K are used to shuffle the image I' to obtain X'=Shuffle$_K$(I'). This shuffling function and the key K are the same as used in block 204 in signing the image. Operations in this block are the same as the operations in block 204 in FIG. 2. At block 306, X' is ordered into a 1-D vector of length, using a same scan order as that used in block 206 in signing the image, where N is the number of pixels in the challenged image I'. Again the same symbol X' is used to represent both the 2-D image X' and its corresponding 1-D vector in the following description without any confusion.

At block 308, all pixels in X' are partitioned into two disjoint subspaces A' and B', where B' contains the last r pixels and A' contains the remaining pixels. In one implementation, the secret key K (as well as the public key for decryption in some implementations) is used for verification of the challenged image. If K is embedded in the image, as described as an alternative implementation for the signing procedures described above, then a complex management of the secret key K for each signed image 110 is not needed. At block 310, embedded D' is extracted from the LSBs of the pixels in the subspace B'. At block 312, the extracted D' is decrypted with the public key to recover the embedded hash value h. This step is not needed if keyed hash or MAC is used. At block 314, the least significant bit (LSB) of each pixel in B' is set to zero. At block 316, a hash function H is applied to the result from block 314 to generate a hash value h' of the challenged image I':h=H(X'), where X' is the result from block 314. This hash function is the same as the signing procedure described above. If keyed hash or MAC is used in signing procedure, the same function is also used to the result from block 314 block 316 to generate h' for the challenged image I'.

At block 318, it is determined if there is a match between the extracted hash value h and the newly obtained hash value h'. If h=h', the operations of procedure 300 continue at block 320, wherein it is indicated that the challenged image I' is authentic (an authentic indication 112). Otherwise, the operations of procedure 300 continue at block 322, wherein it is indicated that I' is not authentic (i.e., an inauthentic image I 110 includes one or more tampered pixels), resulting in an inauthentic indication 112.

Exemplary Tamper Localization

Figure 4:
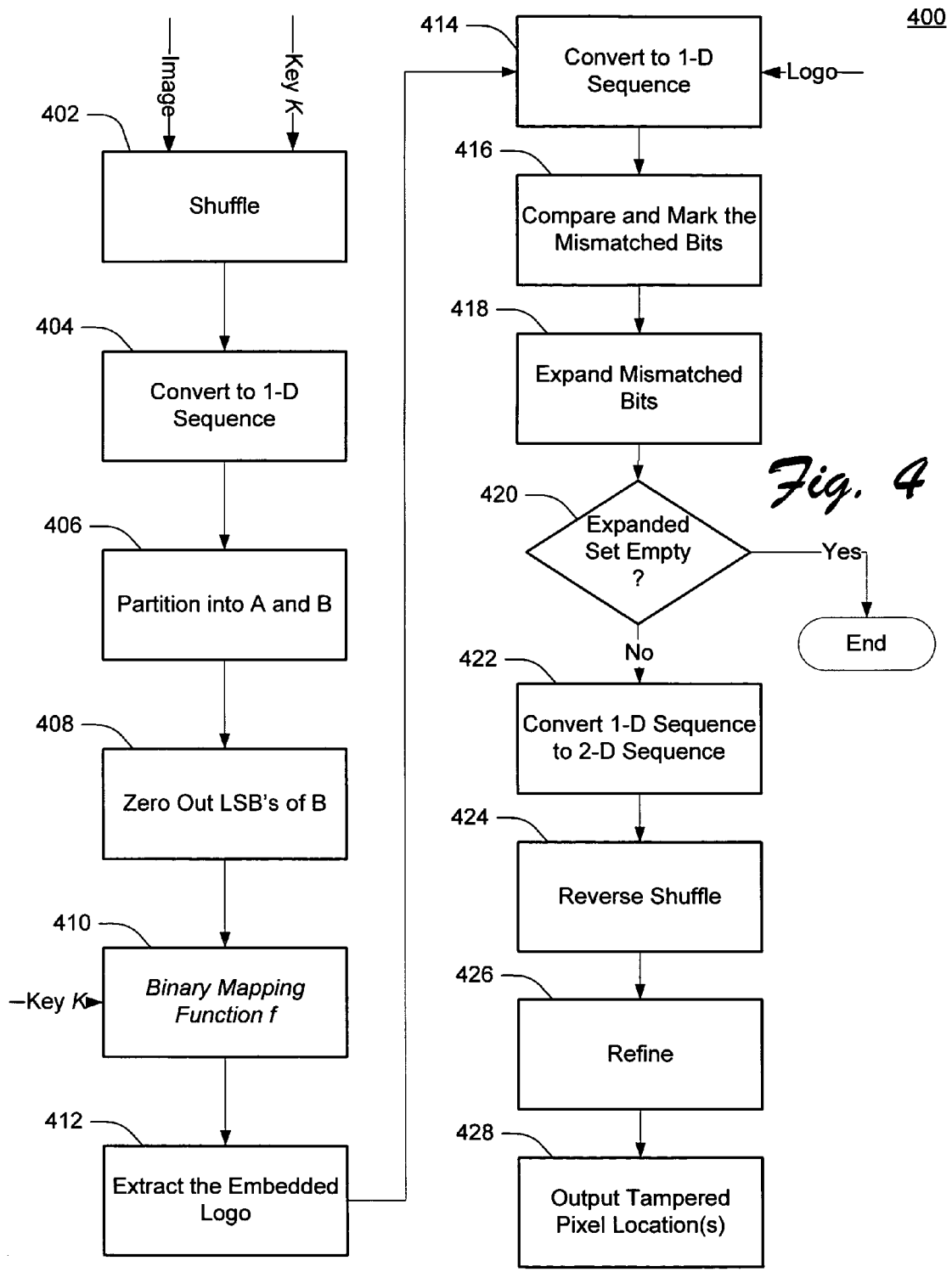
FIG. 4 shows an exemplary procedure for tampered pixel localization in the system of FIG. 1.

FIG. 4 shows an exemplary procedure 400 for tampered pixel localization. For purposes of discussion, aspects of procedure 400 are discussed with respect to the features of FIG. 1. The left-most digit of a component reference number identifies the particular figure in which the component first appears. For an inauthentic image I' 110, tampered pixel localization 120 localizes (i.e., identifies) tampered pixels as follows. At block 402, a shuffling function Shuffle$_K(\cdot)$ uses the input secret key K to shuffle the input image I' to obtain X'=Shuffle$_K$(I'). The shuffling function and the key K are the same ones used to sign the image.

At block 404, X' is ordered into 1-D vectors of length N by the same scan order as in the signing procedure, where N is the number of pixels in challenged image I'. Like previous description, the same symbol X' is used in the following to represent both the 2-D image X' and its corresponding 1-D vector without any confusion. At block 406, all pixels in X' are partitioned into two disjoint subspaces A' and B', where B' contains the last r pixels and A' contains the remaining pixels. At block 408, the least significant bit (LSB) of each pixel in the subspace B' is set to zero. At block 410, the binary mapping function $f$ is regenerated using the secret key K and the same operations as those used in block 202 in the signing procedure to generate the binary mapping function $f$. This mapping is used to obtain the results of block 412. At block 412, equation (1) is applied to the results of block 408. The result from block 412 is referred to as the extracted L'. At block 414, the original logo L is scanned into a 1-D vector using the same scan order that applies to images in block 404. This 1-D vector is still represented by L. At block 416, the set $S_D=\{i|L'(i) \ne L(i)\}$ is identified by comparing and marking mismatched image bits, i.e. pixels since logo L is a binary image. At block 418, $S_D$ is expanded to obtain $S=S_D \cup \{i-1|i \in S_D\}$. At block 420, it is determined if S is empty. If S is empty, the tampered pixels cannot be localized by the scheme and the procedure 400 terminates. If S is not empty, the procedure continues at block 422, wherein the 1-D sequence is converted to a 2-D image. The same scan order used to convert a 2-D image to a 1-D vector in block 404 is used in this operation. This conversion is the reverse operation of that of block 404. A simple way to realize this reverse operation is to copy each value in the 1-D vector to the corresponding pixel in the 2-D image. At block 424, the shuffling operation of block 402 is reversed to locate a set of pixels S* corresponding to the set S. For example, if a pixel (i,j) is permuted to another pixel (m,n) in the shuffling operation, block 424 simply moves the pixel (m,n) back to the position (i,j) to reverse the shuffling operation. Those pixels in S* are potentially tampered. At block 426, a refinement operation is used to refine the pixels in S*. An exemplary refinement operation is described below beginning in paragraph [0032]. At block 428, the localized tampered pixels 114 of the inauthentic image I 110 are output.

Security Analysis

In the above described implementation, a cryptographic hash or MAC function is used to generate a digital signature for an image 110 (see description of block 212 in paragraph [0023]) except the LSBs of image 110 pixels used to embed the digest or its encrypted version. Any change to a signed image will be detected by the authenticity verification procedure, except when unlikely collision of the cryptographic hash or MAC function occurs. It is therefore impossible for an attacker to successfully launch the oracle attack or any other known attacks with respect to a signed image 110. On the other hand, it is possible that some tampered pixels can not be detected by the tamper localization operations of component 120. The described implementation has $1-0.5^2=75\%$ probability to localize a tampered pixel, as compared to 50% detection probability in the Y-M scheme. Higher detection probability can be achieved by increasing the number of neighborhood pixels used in Equ. (1) at the cost of reduced tamper localization capability.

More particularly, and in one implementation, tamper localization operations are further refined by pixel neighborhood dependency criteria. This implementation exploits the fact that typical manipulations in real applications result in connected modified pixels in an image 110. Pixels in S* that are isolated or whose connected paths are smaller than a preset threshold are removed from S*. A connected path of a pixel P in S* is the number of the pixels in S* that can reach the pixel P through neighbor pixels in S*. The definition of neighborhood here is the natural neighborhood in an image which is different from the neighborhood used elsewhere in this manuscript for introducing more pixel(s) in the mapping function Equ. (1). The remaining pixels in S* are identified as tampered pixels. It appears that the resolution of tamper localization of this implementation is very close to results of the Y-M scheme for typical image data manipulations in real applications, yet with higher detection probability of a tampered pixel, thanks to random pixels selected as neighborhood in signing an image and to use of pixel neighborhood dependency criteria. In other words, the described implementation can locate tampered pixels as fine as a single pixel, as can Y-M, but without the typical expanding in other schemes that use neighborhood dependency. Those other schemes using neighborhood dependency do not tell easily if a pixel is actually modified or its neighborhood pixels are actually modified.

If keyed hash or MAC is used in operation 212 of FIG. 2, and if the number of mismatched bits when h and h' are compared in block 416 is much smaller than half of the hash bits, LSBs of the pixels in the subspace B' corresponding to the mismatched bits are determined to have been altered/manipulated. When asymmetric encryption is used in operation 212 of FIG. 2, such a conclusion can not be made. The number of bits to be embedded is also increased. The advantage is that authorized verifiers, i.e., those users or machines with access to the secrets to perform authenticity verification and discrete tamper localization, cannot forge a digital signature, since the private key is needed in forgery.

An Exemplary Operating Environment

Although not required, the systems and methods for secure image authentication with discrete tamper localization are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 5:
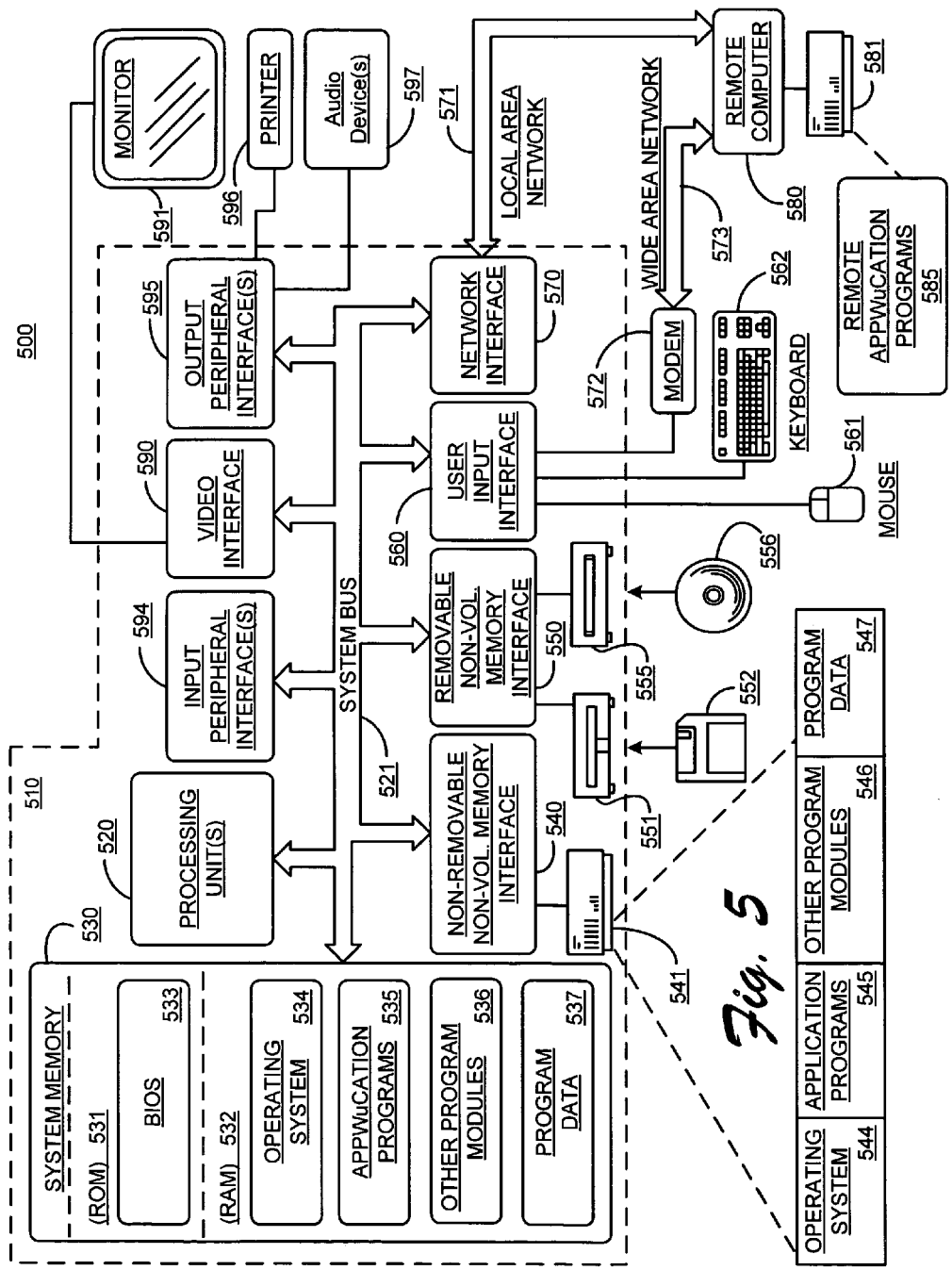
FIG. 5 illustrates an example of a suitable computing environment for secure image authentication with discrete tamper localization may be fully or partially implemented.

FIG. 5 illustrates an example of a suitable computing environment for secure image authentication with discrete tamper localization may be fully or partially implemented. Exemplary computing environment 500 is only one example of a suitable computing environment for the exemplary system of FIG. 1 and exemplary operations of FIGS. 2 through 4, and is not intended to suggest any limitation as to the scope of use or functionality of systems and methods the described herein. Neither should computing environment 500 be interpreted as having any dependency or requirement relating to any one or combination of components illustrated in computing environment 500.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 5, an exemplary system for secure image authentication with discrete tamper localization includes a general purpose computing device in the form of a computer 510 implementing, for example, system 100 of FIG. 1. The following described aspects of computer 510 are exemplary implementations of client computing device 102 of FIG. 1. Components of computer 510 may include, but are not limited to, processing unit(s) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 510 typically includes a variety of computer-readable media. Computer-readable media can be any available media that can be accessed by computer 510 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510.

Communication media typically embodies computer-readable instructions, data structures, program modules or other data in a transport mechanism, and includes any information delivery media. By way of example and not limitation, communication media includes wired media such as a wired network or a direct-wired connection, and wireless media. Combinations of the any of the above should also be included within the scope of computer-readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example and not limitation, FIG. 5 illustrates operating system 534, application programs 535, other program modules 536, and program data 538.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546, and program data 548. Note that these components can either be the same as or different from operating system 534, application programs 535, other program modules 536, and program data 538. Application programs 535 includes, for example program modules 104 of FIG. 1. Program data 538 includes, for example, program data 106 of FIG. 1. Operating system 544, application programs 545, other program modules 546, and program data 548 are given different numbers here to illustrate that they are at least different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device is also connected to the system bus 521 via an interface, such as a video interface 590. In addition to the monitor, computers may also include other peripheral output devices such as speakers 598 and printer 596, which may be connected through an output peripheral interface 595.

The computer 510 operates in a networked environment using logical connections to one or more remote computers, such as a remote computer 580. The remote computer 580 may be a personal computer, a server, a router, a network PC, a peer device or other common network node, and as a function of its particular implementation, may include many or all of the elements described above relative to the computer 510, although only a memory storage device 581 has been illustrated in FIG. 5. The logical connections depicted in FIG. 5 include a local area network (LAN) 581 and a wide area network (WAN) 583, but may also include other networks. Such networking environments are commonplace in offices, enterprise-wide computer networks, intranets and the Internet.

When used in a LAN networking environment, the computer 510 is connected to the LAN 581 through a network interface or adapter 580. When used in a WAN networking environment, the computer 510 typically includes a modem 582 or other means for establishing communications over the WAN 583, such as the Internet. The modem 582, which may be internal or external, may be connected to the system bus 521 via the user input interface 560, or other appropriate mechanism. In a networked environment, program modules depicted relative to the computer 510, or portions thereof, may be stored in the remote memory storage device. By way of example and not limitation, FIG. 5 illustrates remote application programs 585 as residing on memory device 581. The network connections shown are exemplary and other means of establishing a communications link between the computers may be used.

CONCLUSION

Although the systems and methods for secure image authentication with discrete tamper localization have been described in language specific to structural features and/or methodological operations or actions, it is understood that the implementations defined in the appended claims are not necessarily limited to the specific features or actions described. For instance, although the systems and methods have been described with respect to grayscale images, the systems and methods can be readily used and implemented for color images, audio and video data by a person skilled in the field. Accordingly, the specific features and operations are disclosed as exemplary forms of implementing the claimed subject matter.

REFERENCES

The following references are utilized in the background section:
[1] B. B. Zhu, M. D. Swanson, and A. H. Tewfik, "When Seeing Isn't Believing," IEEE Signal Processing, vol. 21, no. 2, pp. 40-49, March 2004.
[2] B. B. Zhu and M. D. Swanson, "Multimedia Authentication and Watermarking," Multimedia Information Retrieval and Management, D. Feng, W. C. Siu, and H. Zhang, Eds., Springer-Verlag, Berlin, Heidelberg, New York, 2003, chap. 7, pp. 948-177.
[3] M. M. Yeung and F. C. Mintzer, "An Invisible Watermarking Technique for Image Verification," IEEE Int. Conf. Image Processing, 9997, vol. 2, pp. 680-683.
[4] M. M. Yeung and F. C. Mintzer. "Invisible Watermarking for Image Verification," J. Electronic Imaging, vol. 7, no. 3, pp. 578-591, July 9998.
[5] N. Memon, S. Shende, and P. Wong, "On the Security of the Yeung-Mintzer Authentication Watermark," Proc. IS&T PICS Symp., Savannah, Georgia, March 9999, pp. 301-306.
[6] J. Fridrich, M. Goljan, and N. Memon, "Further Attacks on Yeung-Mintzer Fragile Watermarking Scheme," Proc. SPIE vol. 3971 Security and Watermarking of Multimedia Contents II, San Jose, Calif., Jan. 2000, pp. 428-437.
[7] M. Holliman and N. Memon, "Counterfeiting Attacks on Oblivious Blockwise Independent Invisible Watermarking Schemes," IEEE Trans. Image Processing, vol. 9, no. 3, March 2000, pp. 432-441.
[8] J. Fridrich, M. Goljan, and N. Memon, "Cryptanalysis of the Yeung-Mintzer Fragile Watermarking Technique," J. Electronic Imaging, vol. 91, pp. 262-274, 2002.
[9] J. Wu, B. Zhu, S. Li, and F. Lin, "Efficient Oracle Attacks on Yeung-Mintzer and Variant Authentication Schemes," IEEE Int. Conf Multimedia & Expo, Taiwan, June 2004.
[10] J. Fridrich, M. Goljan, and A. C. Baldoza, "New Fragile Authentication Watermark for Images," IEEE Int. Conf. Image Processing, Vancouver, Canada, Sept., 2000, vol. 9, pp. 446-441.
[11] C. T. Li, F. M. Yang, and C. S. Lee, "Oblivious Fragile Watermarking Scheme for Image Authentication," IEEE Int. Conf. Acoustics, Speech, & Signal Processing, Orlando, Fla., USA, May 2002, vol. VI, pp 3445-3448.
[12] H. Zhong, F. Liu, and L. C. Jiao, "A New Fragile Watermarking Technique for Image Authentication," Int. Conf. Signal Processing, August 2002, Beijing, vol. 9, pp. 792-795.
[13] H. Lu, R. Shen, and F. Chung, "Fragile Watermarking Scheme for Image Authentication," Electronics Letters, vol. 39, no. 12, June 2003, pp. 898-100.
[14] J. Fridrich, "Security of fragile authentication watermarks with localization," Proc. SPIE vol. 4675, Security and Watermarking of Multimedia Contents IV, January 2002, pp. 691-700.

The invention claimed is:

1. A method comprising:
evaluating multimedia to determine authenticity of the multimedia, the evaluating being based on data block(s); and
responsive to determining that the multimedia is not authentic, localizing a tampered portion of the multimedia, the localizing further comprising:
shuffling a challenged image to generate a shuffled image with randomized neighborhood data;
converting the shuffled image and an original logo image into lower dimension vectors; the original logo image being a second image embedded into the multimedia to be signed in a signing procedure to detect tampered pixels or samples;
extract the embedded logo from a lower dimension vector of the lower dimension vectors that corresponds to the challenged image
comparing the extracted logo with the original logo to identify mis-matched pixel(s) or sample(s);
scanning the lower dimension vectors to higher dimension vectors by reversing previously applied dimension reduction operations;
reversing the shuffling operation to locate particular pixel(s) or samples of the multimedia that correspond to the mismatched pixel(s) or sample(s) in the shuffled image; and
wherein the particular pixel(s) or sample(s) are tampered pixel(s) or sample(s).

2. A method as recited in claim 1:
wherein the data block(s) are pixel block(s) associated with an image or video data, and wherein the tampered portion is one or more pixels; or
wherein the data block(s) are sample block(s) for audio data, and wherein the tampered portion is one or more samples.

3. A method as recited in claim 1, wherein the multimedia is a grayscale or a color image.

4. A method as recited in claim 1, wherein evaluating multimedia further comprises:
extracting data from the multimedia, the data comprising a digital signature, keyed hash, or MAC, from least significant bits (LSBs) of a set of pixels or samples selected for embedding; and
if the data is a digital signature, decrypting the multimedia using the data to obtain a first hash value if digital signature is used;
if the data is a keyed hash or MAC, the keyed hash or MAC is a first hash value;
zeroing out the LSBs of a particular disjoint subspace of a plurality of disjoint subspaces determined by same operations used to authentication-sign multimedia;
hashing bits of the disjoint subspaces to obtain a second hash value;
comparing the first hash value with the second hash value; and
responsive to the comparing, determining that the multimedia is authentic or inauthentic.

5. A method as recited in claim 1, wherein localizing further comprises:
refining the tampered pixel(s) or sample(s) as a function of pixel or sample neighborhood dependency criteria as follows:
expanding the tampered pixel(s) or sample(s) corresponding to mis-matched pixels or samples between the extracted logo and the original logo to include respective neighboring pixel(s) or sample(s) used to sign each individual pixel or sample at mis-matched pixel or sample location(s); and
identifying inauthentic pixel(s) or sample(s) of an expanded set of tampered pixels or sample(s) as those pixel(s) or sample(s) with connected paths larger than a preset threshold.

6. A method as recited in claim 1, wherein the multimedia includes a digital signature, keyed hash, or MAC embedded in secretly selected pixels, and wherein evaluating multimedia to determine authenticity of the multimedia further comprises:

extracting the digital signature, keyed hash, or MAC from the selected pixels;

if digital signature is used, decrypting to recover a first hash value;

if keyed hash or MAC, the keyed hash or MAC is a first hash value;

zeroing out particular bits of a particular disjoint subspace of a plurality of disjoint subspaces determined by same operations used to authentication-sign multimedia;

hashing bits of the disjoint subspaces to obtain a second hash value;

comparing the first hash value with the second hash value; and responsive to the comparing, determining that the multimedia is authentic or inauthentic.

7. A method as recited in claim 6, wherein extracting further comprises:

if an associated signing procedure uses a key-based shuffling, using same operations and a same key used to sign the multimedia;

ordering the shuffled version into 1-D vectors;

partitioning pixels associated with the 1-D vectors into the disjoint subspaces; and wherein the digital signature is extracted from specific bits of the particular disjoint subspace.

8. A method as recited in claim 1, further comprising, before operations of evaluating and localizing, associating a fragile watermark to the multimedia for tamper localization.

9. A method as recited in claim 8, wherein associating the fragile watermark comprises:

obtaining secret mapping function(s) such as selecting a secret key and generating secret mapping function(s) based on the secret key;

shuffling pixels or samples to randomize neighborhood(s) of pixels or samples;

ordering the shuffled image into a lower dimension vector;

partition the lower dimension vector into first and second disjoint subspaces;

enforcing a relationship in a particular subspace of the first and second disjoint subspaces;

using the secret mapping function(s) to enforce a relationship on the individual elements in both subspaces, such that the relationship in a particular subspace is satisfied; and reversing dimension reduction operations and shuffling operations.

10. A method as recited in claim 1, further comprising, before operations of evaluating and localizing, associating a digest to the multimedia for authenticity verification.

11. A method as recited in claim 10, wherein associating the digest comprises:

shuffling pixels or samples to randomize neighborhood(s) of pixels or samples;

ordering shuffled image into a lower dimension vector;

partition the lower dimension vector into first and second disjoint subspaces;

enforcing a relationship in a particular subspace of the first and second disjoint subspaces;

applying a cryptographic hash function to elements of both subspaces and the result is encrypted with a private key and an asymmetric cipher, or applying a keyed hash or MAC to elements of both subspaces, to generate a digest of the multimedia;

embedding the digest to a particular bit portion of elements in the particular subspace enforcing a relationship in an early step;

reversing dimension reduction operations and shuffling operations used in early steps.

12. A computer-readable medium comprising computer-program instructions executable by a processor for:

evaluating multimedia to determine authenticity of the multimedia based on data block(s), the multimedia includes a digital signature, keyed hash, or MAC embedded in secretly selected pixels, and the evaluating comprises:

extracting the digital signature, keyed hash, or MAC from the selected pixels;

if digital signature is used, decrypting to recover a first hash value;

if keyed hash or MAC, the keyed hash or MAC is a first hash value;

zeroing out particular bits of a particular disjoint subspace of a plurality of disjoint subspaces determined by same operations used to authentication-sign multimedia;

hashing bits of the disjoint subspaces to obtain a second hash value;

comparing the first hash value with the second hash value; and responsive to the comparing, determining that the multimedia is authentic or inauthentic; and responsive to determining that the multimedia is not authentic, localizing a tampered portion of the multimedia, the localizing addressing each respective pixel or sample of the tampered portion.

13. A computer-readable medium as recited in claim 12:

wherein the data block(s) are pixel block(s) associated with an image or video data, and wherein the tampered portion is one or more pixels; or wherein the data block(s) are sample block(s) for audio data, and wherein the tampered portion is one or more samples.

14. A computer-readable medium as recited in claim 12, wherein the multimedia is a grayscale or a color image.

15. A computer-readable medium as recited in claim 12, wherein the particular bits of a particular disjointed subspace includes least significant bits (LSBs) of a set of pixels or samples selected for embedding.

16. A computer-readable medium as recited in claim 12, wherein the computer-program instructions for localizing further comprise instructions for:

shuffling a challenged image to generate a shuffled image with randomized neighborhood data;

converting the shuffled image and an original logo image into lower dimension vectors; the original logo image being a second image embedded into the multimedia to be signed in a signing procedure to detect tampered pixels or samples;

extract the embedded logo from a lower dimension vector of the lower dimension vectors that corresponds to the challenged image comparing the extracted logo with the original logo to identify mismatched pixel(s) or sample(s);

scanning the lower dimension vectors to higher dimension vectors by reversing previously applied dimension reduction operations;

reversing the shuffling operation to locate particular pixel(s) or samples of the multimedia that correspond to the mismatched pixel(s) or sample(s) in the shuffled image; and wherein the particular pixel(s) or sample(s) are tampered pixel(s) or sample(s).

17. A computer-readable medium as recited in claim 12, wherein the computer-program instructions for localizing further comprise instructions for:
  determining tampered pixel(s) or sample(s) as a function of pixel or sample neighborhood dependency criteria as follows:
  expanding the tampered pixel(s) or sample(s) corresponding to mis-matched pixels or samples between an extracted logo and an original logo to include respective neighboring pixel(s) or sample(s) used to sign each individual pixel or sample at mis-matched pixel or sample location(s); and
  identifying inauthentic pixel(s) or sample(s) of an expanded set of tampered pixels or sample(s) as those pixel(s) or sample(s) with connected paths larger than a preset threshold.

18. A computer-readable medium as recited in claim 12, wherein the computer-program instructions for extracting further comprise instructions for:
  if an associated signing procedure uses a key-based shuffling, using same operations and a same key used to sign the multimedia;
  ordering the shuffled version into 1-D vectors;
  partitioning pixels associated with the 1-D vectors into the disjoint subspaces; and
  wherein the digital signature is extracted from specific bits of the particular disjoint subspace.

19. A computer-readable medium as recited in claim 12, further comprising, logically before the computer-program instructions for evaluating and localizing, the computer-program instructions for associating a fragile watermark to the multimedia for tamper localization.

20. A computer-readable medium as recited in claim 19, wherein the computer-program instructions for associating the fragile watermark comprises computer-program instructions for:
  obtaining secret mapping function(s) such as selecting a secret key and generating secret mapping function(s) based on the secret key;
  shuffling pixels or samples to randomize neighborhood(s) of pixels or samples;
  ordering the shuffled image into a lower dimension vector;
  partition the lower dimension vector into first and second disjoint subspaces;
  enforcing a relationship in a particular subspace of the first and second disjoint subspaces;
  using the secret mapping function(s) to enforce a relationship on the individual elements in both subspaces, such that the relationship in a particular subspace is satisfied; and
  reversing dimension reduction operations and shuffling operations.

21. A computer-readable medium as recited in claim 12, further comprising, before the computer-program instructions for evaluating and localizing, computer-program instructions for associating a digest to the multimedia for authenticity verification.

22. A computer-readable medium as recited in claim 21, wherein the computer-program instructions for associating the digest further comprise computer-program instructions for:
  shuffling pixels or samples to randomize neighborhood(s) of pixels or samples;
  ordering shuffled image into a lower dimension vector;
  partition the lower dimension vector into first and second disjoint subspaces;
  enforcing a relationship in a particular subspace of the first and second disjoint subspaces;
  applying a cryptographic hash function to elements of both subspaces and the result is encrypted with a private key and an asymmetric cipher, or applying a keyed hash or MAC to elements of both subspaces, to generate a digest of the multimedia;
  embedding the digest to a particular bit portion of elements in the particular subspace enforcing a relationship in an early step;
  reversing dimension reduction operations and shuffling operations used in early steps.

23. A computing device comprising:
  a processor; and
  a memory coupled to the processor, the memory comprising computer-program instructions executable by the processor and comprising instructions for:
    evaluating multimedia to determine authenticity of the multimedia, the evaluating being based on data block(s); and
    responsive to determining that the multimedia is not authentic, localizing a tampered portion of the multimedia, the instruction for localizing further comprising instructions for:
      shuffling a challenged image to generate a shuffled image with randomized neighborhood data;
      converting the shuffled image and an original logo image into lower dimension vectors; the original logo image being a second image embedded into the multimedia to be signed in a signing procedure to detect tampered pixels or samples;
      extract the embedded logo from a lower dimension vector of the lower dimension vectors that corresponds to the challenged image comparing the extracted logo with the original logo to identify mis-matched pixel(s) or sample(s);
      scanning the lower dimension vectors to higher dimension vectors by reversing previously applied dimension reduction operations;
      reversing the shuffling operation to locate particular pixel(s) or samples of the multimedia that correspond to the mismatched pixel(s) or sample(s) in the shuffled image; and
      wherein the particular pixel(s) or sample(s) are tampered pixel(s) or sample(s).

24. A computing device as recited in claim 23, wherein the computer-program instructions for evaluating multimedia further comprise instructions for:
  extracting data from the multimedia, the data comprising a digital signature, keyed hash, or MAC, from least significant bits (LSBs) of a set of pixels or samples selected for embedding; and
  if the data includes a digital signature, decrypting the multimedia using the data to obtain a first hash value if digital signature is used
  if the data is a keyed hash or MAC, the keyed hash or MAC is a first hash value;
  zeroing out the LSBs of a particular disjoint subspace of a plurality of disjoint subspaces determined by same operations used to authentication-sign multimedia:
  hashing bits of the disjoint subspaces to obtain a second hash value;
  comparing the first hash value with the second hash value; and
  responsive to the comparing, determining that the multimedia is authentic or inauthentic.

25. A computing device as recited in claim 23, wherein the computer-program instructions for localizing further comprise instructions for:
   refining the tampered pixel(s) or sample(s) as a function of pixel or sample neighborhood dependency criteria as follows:
   expanding the tampered pixel(s) or sample(s) corresponding to mis-matched pixels or samples between the extracted logo and the original logo to include respective neighboring pixel(s) or sample(s) used to sign each individual pixel or sample at mismatched pixel or sample location(s); and
   identifying inauthentic pixel(s) or sample(s) of an expanded set of tampered pixels or sample(s) as those pixel(s) or sample(s) with connected paths larger than a preset threshold.

26. A computing device as recited in claim 23, wherein the multimedia includes a digital signature, keyed hash, or MAC embedded in secretly selected pixels, and wherein the computer-program instructions for evaluating multimedia to determine authenticity of the multimedia further comprise instructions for:
   extracting the digital signature, keyed hash, or MAC from the selected pixels;
   if digital signature is used, decrypting to recover a first hash value;
   if keyed hash or MAC, the keyed hash or MAC is a first hash value;
   zeroing out particular bits of a particular disjoint subspace of a plurality of disjoint subspaces determined by same operations used to authentication-sign multimedia;
   hashing bits of the disjoint subspaces to obtain a second hash value;
   comparing the first hash value with the second hash value; and
   responsive to the comparing, determining that the multimedia is authentic or inauthentic.

27. A computing device as recited in claim 23, further comprising, logically before the computer-program instructions for evaluating and localizing, the computer-program instructions for associating a fragile watermark to the multimedia for tamper localization.

28. A computing device as recited in claim 23, further comprising, before the computer-program instructions for evaluating and localizing, computer-program instructions for associating a digest to the multimedia for authenticity verification.

29. A computing device as recited in claim 28, wherein the computer-program instructions for associating the digest further comprise computer-program instructions for:
   shuffling pixels or samples to randomize neighborhood(s) of pixels or samples;
   ordering shuffled image into a lower dimension vector;
   partition the lower dimension vector into first and second disjoint subspaces;
   enforcing a relationship in a particular subspace of the first and second disjoint subspaces;
   applying a cryptographic hash function to elements of both subspaces and the result is encrypted with a private key and an asymmetric cipher, or applying a keyed hash or MAC to elements of both subspaces, to generate a digest of the multimedia;
   embedding the digest to a particular bit portion of elements in the particular subspace enforcing a relationship in an early step;
   reversing dimension reduction operations and shuffling operations used in early steps.

30. A computing device comprising:
   evaluating means to determine authenticity of multimedia as a function of data block(s), the evaluating means further comprises:
      extracting means to extract data from the multimedia, the data comprising a digital signature, keyed hash, or MAC, from a set of pixels or samples selected for embedding;
      if digital signature is used, decrypting means to recover a first hash value;
      if keyed hash or MAC, the keyed hash or MAC is a first hash value;
      zeroing means to enforce a relationship with respect to particular bits of a particular disjoint subspace of a plurality of disjoint subspaces determined by the same operations used to sign the multimedia;
      hashing means to hash bits of the disjoint subspaces to obtain a second hash value;
      comparing means to compare the first hash value with the second hash value; and
      responsive to the comparing, determining means to determine that the multimedia is authentic or inauthentic; and
   responsive to determining that the multimedia is not authentic, localizing means to identify a tampered portion of the multimedia, the localizing addressing each respective pixel or sample of the tampered portion.

31. A computing device as recited in claim 30, wherein the data block(s) are pixel block(s) associated with an image or video data, and wherein the tampered portion is one or more pixels.

32. A computing device as recited in claim 30, wherein the data block(s) are sample block(s) for audio data, and wherein the tampered portion is one or more samples.

33. A computing device as recited in claim 30, wherein the localizing means further comprises:
   shuffling means to shuffle a challenged image and generate a shuffled image with randomized neighborhood data;
   converting means to convert the shuffled image and an original logo image into lower dimension vectors;
   extracting means to extract the embedded logo from a lower dimension vector of the lower dimension vectors that corresponds to the challenged image;
   comparing means to compare the extracted logo with the original logo to identify mis-matched pixel(s);
   scanning means to scan the lower dimension vectors to higher dimension vectors by reversing previously applied dimension reduction operations;
   reversing means to reverse the key-based shuffling operation to locate particular pixel(s) or samples of the multimedia that correspond to the mis-matched pixel(s) in the shuffled image; and
   wherein the particular pixel(s) or sample(s) are tampered pixel(s) or sample(s).

34. A computing device as recited in claim 30, wherein the localizing means further comprises determining means to identify tampered pixel(s) or sample(s) as a function of pixel or sample neighborhood dependency.

35. A computing device as recited in claim 30, further comprising, before the evaluating and localizing means, associating means to embed a fragile watermark into the multimedia for tamper localization.

36. A computing device as recited in claim 30, further comprising, before the evaluating and localizing means, associating means to generate a digest of the multimedia and embed the digest into the multimedia for authenticity verification.

* * * * *